United States Patent
Zhang et al.

(10) Patent No.: US 12,505,639 B2
(45) Date of Patent: Dec. 23, 2025

(54) ENHANCING IMAGE DATA FOR DIFFERENT TYPES OF DISPLAYS

(71) Applicant: IMAX Corporation, Mississauga (CA)

(72) Inventors: Ning Zhang, Oakville (CA); Samuel Ziheng Zhou, Mississauga (CA)

(73) Assignee: IMAX CORPORATION, Mississauga (CA)

( * ) Notice: Subject to any disclaimer, the term of this patent is extended or adjusted under 35 U.S.C. 154(b) by 356 days.

(21) Appl. No.: 18/246,886

(22) PCT Filed: Oct. 1, 2021

(86) PCT No.: PCT/IB2021/059059
§ 371 (c)(1),
(2) Date: Mar. 28, 2023

(87) PCT Pub. No.: WO2022/070163
PCT Pub. Date: Apr. 7, 2022

(65) Prior Publication Data
US 2023/0368489 A1 Nov. 16, 2023

Related U.S. Application Data

(60) Provisional application No. 63/090,078, filed on Oct. 9, 2020, provisional application No. 63/086,668, filed on Oct. 2, 2020.

(51) Int. Cl.
*G06V 10/42* (2022.01)
*G06F 3/14* (2006.01)
(Continued)

(52) U.S. Cl.
CPC ............... *G06V 10/42* (2022.01); *G06F 3/14* (2013.01); *G06T 7/10* (2017.01); *G06V 10/761* (2022.01)

(58) Field of Classification Search
CPC ........ G06V 10/42; G06V 10/761; G06F 3/14; G06T 7/10; G09G 5/363; H04N 21/23418; H04N 21/23439; H04N 21/23614
See application file for complete search history.

(56) References Cited

U.S. PATENT DOCUMENTS 9,483,812 B2   11/2016   Zhang et al.
9,576,065 B2 * 2/2017   Mukherjee ............ G06F 16/972
(Continued)

FOREIGN PATENT DOCUMENTS

WO   2019145835 A1   8/2019

OTHER PUBLICATIONS

European Patent Application No. 21874718.6, Extended European Search Report mailed Sep. 12, 2024, 11 pages.
(Continued)

*Primary Examiner* — Ming Y Hon
(74) *Attorney, Agent, or Firm* — Kilpatrick Townsend & Stockton LLP

(57) ABSTRACT

A method is provided for generating enhanced image data for display on different types of display platforms. The method can include receiving a first format of display image data mastered to be displayed on a first type of display system. The method can include receiving a second format of display image data mastered to be displayed on a second type of display system that is different than the first type of display system. The method can include detecting one or more corresponding pixels in image segments among the first format of display image data and the second format of display image data. The method can include using attributes from the one or more corresponding pixel to generate enhanced image data for display.

30 Claims, 7 Drawing Sheets

(51) Int. Cl.
*G06T 7/10* (2017.01)
*G06V 10/74* (2022.01)

(56) References Cited

U.S. PATENT DOCUMENTS

| | | | |
|---|---|---|---|
| 10,477,170 B2 | 11/2019 | Damberg et al. | |
| 2005/0213118 A1* | 9/2005 | Shitara | G06K 15/025 715/255 |
| 2008/0049034 A1* | 2/2008 | Chin | G06F 3/1438 345/535 |
| 2010/0231593 A1 | 9/2010 | Zhou et al. | |
| 2011/0154426 A1 | 6/2011 | Doser et al. | |
| 2012/0075421 A1* | 3/2012 | Tsukagoshi | H04N 19/597 348/E13.001 |
| 2012/0195503 A1 | 8/2012 | Kim et al. | |
| 2013/0315505 A1 | 11/2013 | Atkins et al. | |
| 2014/0146370 A1* | 5/2014 | Banner | G06V 10/7715 358/406 |
| 2015/0371426 A1* | 12/2015 | Levy | G06T 13/80 345/473 |
| 2016/0048951 A1 | 2/2016 | Zhang et al. | |
| 2016/0360083 A1* | 12/2016 | Nilsson | G06T 5/50 |
| 2018/0060683 A1* | 3/2018 | Kontsevich | H04N 23/80 |
| 2018/0075587 A1* | 3/2018 | Swami | H04N 5/265 |
| 2018/0324474 A1 | 11/2018 | Silverman et al. | |
| 2019/0311744 A1* | 10/2019 | Shenkler | G11B 27/10 |
| 2019/0335161 A1* | 10/2019 | Courtès | H04N 5/262 |
| 2020/0074243 A1* | 3/2020 | Gu | G06V 10/764 |
| 2021/0027100 A1* | 1/2021 | Bogdanovych | G06F 18/214 |
| 2021/0213615 A1* | 7/2021 | Yu | B25J 9/163 |

OTHER PUBLICATIONS

"SMPTE Standard—Material Exchange Format (MXF)—File Format Specification", SMPTE ST 377-1:2011, vol. No. 7, Jun. 7, 2011, pp. 1-183.

Damberg et al., "Light Steering Projection Systems and Attributes for HDR Displays", The Society for Information Display Technical Digests, Jun. 2, 2017, 4 pages.

International Patent Application No. PCT/IB2021/059059, "International Search Report and Written Opinion", mailed Dec. 17, 2021, 10 pages.

* cited by examiner

ENHANCING IMAGE DATA FOR DIFFERENT TYPES OF DISPLAYS

CROSS REFERENCE TO RELATED APPLICATION

This claims priority to U.S. Provisional Application Ser. No. 63/086,668, filed Oct. 2, 2020 and titled "ENHANCING IMAGE DATA FOR DIFFERENT TYPES OF DISPLAYS," and to U.S. Provisional Application Ser. No. 63/090,078, filed Oct. 9, 2020 and titled "ENHANCING IMAGE DATA FOR DIFFERENT TYPES OF DISPLAYS," the entirety of each of which is incorporated herein by reference.

FIELD OF THE DISCLOSURE

This disclosure relates generally to digitally enhancing content of image data such as motion picture data and, more specifically (although not necessarily exclusively), to modifying the image content to be presented on different types of display platforms.

BACKGROUND

Image content, such as a motion picture or a video production, can be mastered for a designated display platform in a professional facility. Mastered image content may or may not include a content creator approving the visual appearance of the image content based on the visual imagery displayed on a display device representative of the display platform. For example, mastering a motion picture may be performed in a post-production facility equipped with a DCI-certified cinema projector. Similarly, a video production intended for broadcasting may be mastered in a production suite equipped with calibrated professional monitors. With an increasing popularity of on-demand streaming services available to homes and mobile devices, a motion picture or a video production may be released to such display platforms in addition to a wide range of other display platforms, including home theatres, indoor signage panels, and outdoor billboards. The different display platforms have very different characteristics among each other, including aspect ratio, resolution, frame rate, color gamut, brightness level, contrast, dynamic range, black level, and white point. The image content may appear vastly different on each display platform unless professionally mastered for each display device. Moreover, within each display platform, traditional display technologies are being rapidly replaced by newer generations of display technologies such as LED, QD, OLED, MicroLED, and laser projection, and each new generation of display technology inevitably introduces a distinct and novel visual appearance.

For example, peak brightness is one of the characteristics that can be used to characterize a display platform. Peak brightness is the maximum light output capacity of the display platform. A standard cinema is designed for a dark viewing environment, and it can provide a peak brightness of 48 nits on a projection screen. A typical IMAX® theatre screen can provide a nearly 60% higher peak brightness level for a large-format cinema viewing environment. A direct-view LED cinema screen can deliver 300 nits of light full screen, while a projector based on light-steering technology can provide even higher brightness level in highlight regions. Home TV and mobile devices can provide higher peak brightness levels because those devices are designed for a much brighter viewing environment. Certain brands of OLED TV screens can exceed 600 nits of peak brightness, while other types of TV systems may exceed 1000 nits. Some mobile phone screens are designed for daylight viewing conditions and can produce even higher brightness levels. Different display platforms may also differ greatly with other characteristics such as color, contrast, and dynamic range. When a motion picture or a video production is to be released to such a wide range of display platforms, it becomes increasingly difficult and cost prohibitive to master the image content for potentially applicable display platforms and display technologies.

The appearance of image content can be enhanced based on characteristics of a display device by using image processing techniques. One example can be based on an appearance graph. An image sequence is processed using various methods to render multiple prime layer sequences, each with a distinctive visual appearance. The prime layer sequences are combined to produce a new image sequence with a new visual appearance based on an appearance graph. The visual appearance of the resulting image sequence can be further fine-tuned by adjusting the contributions from prime layer sequences. Certain prime layer sequences may be computed based on pixel motion information including optical flow or more accurate trajectories. Such an appearance-graph based method provides only a limited range of visual appearance enhancement and, therefore, may not be adapted to a wide range of display platforms and viewing conditions without involving costly mastering treatments that are time consuming and impractical.

SUMMARY

In one example, a method includes receiving a first format of display image data mastered to be displayed on a first type of display system. The method includes receiving a second format of display image data mastered to be displayed on a second type of display system that is different than the first type of display system. The method includes detecting one or more corresponding pixels in image segments among the first format of display image data and the second format of display image data. The method also includes using attributes from the one or more corresponding pixels to generate enhanced image data for display.

In another example, a method of image enhancement includes receiving a first format of display image data mastered to be displayed on a first type of display system. The method includes receiving a second format of display image data mastered to be displayed on a second type of display system that is different than the first type of display system. The method includes generating segmented image data by comparing the first format of display image data and the second format of display image data to determine a plurality of image data similarities and a plurality of image data differences. The method includes determining, based on spatial correspondence or temporal correspondence, a corresponding pixel pair between the first format of display image data and the second format of display image data from the segmented image data. The method includes defining a local mask sequence using the corresponding pixel pair. The method also includes outputting the local mask sequence as a mask file for generating enhanced image data to be displayed.

In another example, a system comprises a processing device and a non-transitory memory comprising instructions that are executable by the processing device for causing the processing device to perform operations. The operations include receiving a first format of display image data mastered to be displayed on a first type of display system. The operations include receiving a second format of display image data mastered to be displayed on a second type of display system that is different than the first type of display system. The operations include detecting one or more corresponding pixels in image segments among the first format of display image data and the second format of display image data. The operations also include using attributes from the one or more corresponding pixels to generate enhanced image data for display.

In another example, an image enhancement system comprises a processing device and a non-transitory computer-readable memory comprising instructions that are executable by the processing device for causing the processing device to perform operations. The operations include receiving a first format of display image data mastered to be displayed on a first type of display system. The operations include receiving a second format of display image data mastered to be displayed on a second type of display system that is different than the first type of display system. The operations include generating segmented image data by comparing the first format of display image data and the second format of display image data to determine a plurality of image data similarities and a plurality of image data differences. The operations include determining, based on spatial correspondence or temporal correspondence, a corresponding pixel pair between the first format of display image data and the second format of display image data from the segmented image data. The operations include defining a local mask sequence using the corresponding pixel pair. The operations also include outputting the local mask sequence as a mask file for generating enhanced image data to be displayed.

DETAILED DESCRIPTION

Figure 1:
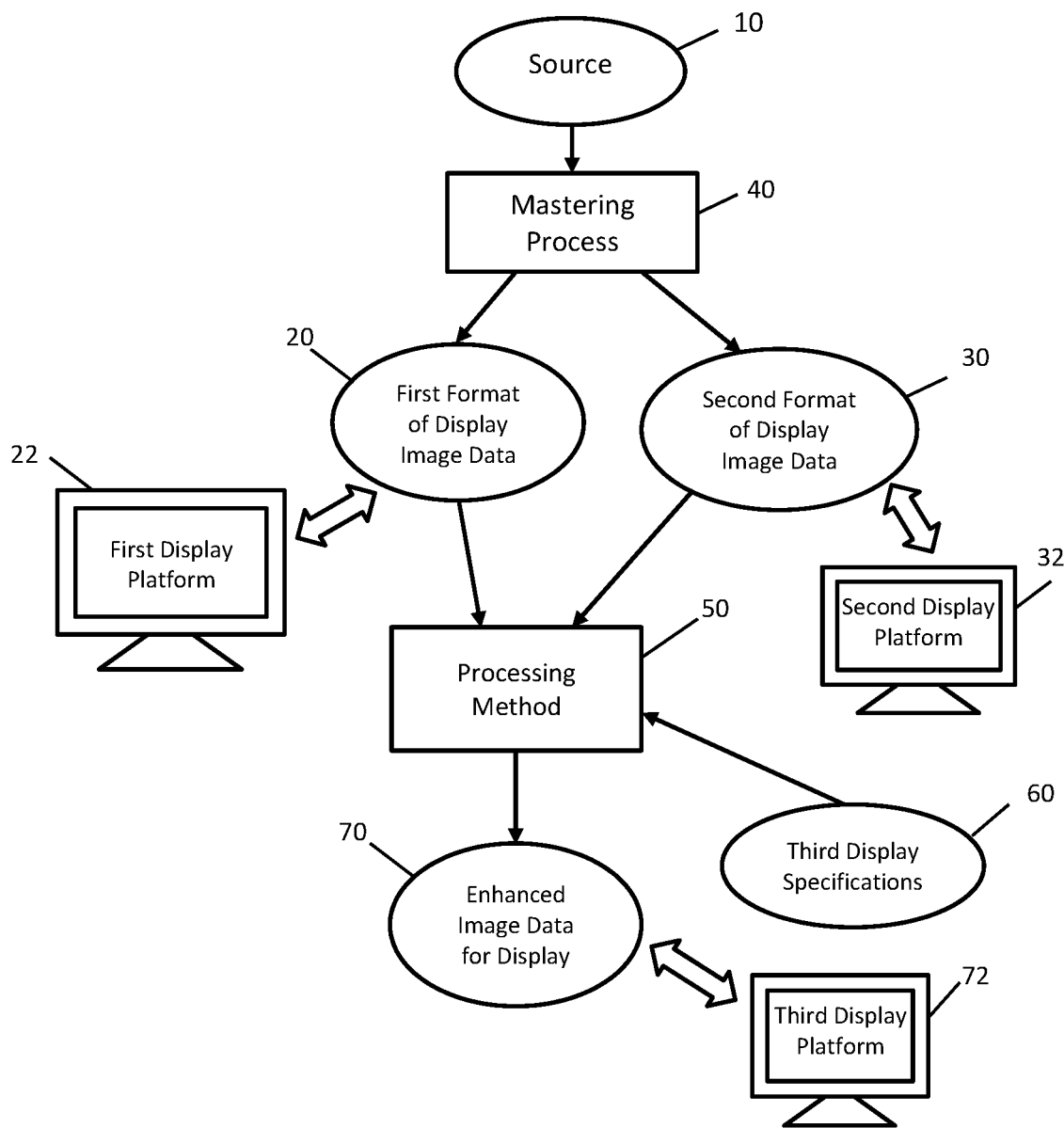
FIG. 1 is a schematic of an environment for modifying image content for different display devices according to one example of the present disclosure.

Certain aspects and features relate to enhancing one or more characteristics of a sequence of image data by analyzing attributes between at least two versions of the sequence of image data, each mastered for a specific display device and a specific viewing environment. The image analysis can be performed globally across the image content and locally at a specific part of the image content. An enhanced sequence of image data can be generated by transferring selected attributes between two versions of the sequences of image data. The enhanced version may be an enhancement of one or both versions of the sequence of image data. In other examples, the enhanced version may be in a third version of the sequences of image data that is enhanced image data for display on a different type of display device than the display devices on which the two versions were mastered for display.

A sequence of image data, or an image sequence, includes multiple frames of images with motion information. Each image frame includes multiple image pixels. An image pixel can define a picture element at a space-time location that is related to neighboring image pixels in the same image frame and may also be related to similar pixels across other image frames in the same image sequence. Each image pixel is a sample of an original image at a specific space-time location, and an image pixel is typically represented by a set of triples or quadruples of values, such as RGB, XYZ, or CMYK values. The pixel values define the content of an image or an image sequence, but the actual appearance of the images also depends on the characteristics of a display platform where the images are to be displayed.

A display platform can include a display hardware device, software and firmware for display functions, and a viewing environment. The appearance of image content displayed from a display platform can be depend on certain characteristics of the display platform. Examples of such characteristics include aspect ratio, resolution, frame rate, color gamut, brightness level, contrast, dynamic range, black level, and white point. In one example, a standard dynamic range (SDR) display platform may be limited to a peak brightness of 200-300 nits, while a high dynamic range (HDR) display platform may support a peak brightness of 1000 nits or higher. An HDR display platform can also provide a darker black level and increase overall contrast of the display platform. In another example, a standard digital cinema projector with full DCI-P3 support can reproduce a color range of approximately 45% of visible colors, while a wide color gamut (WCG) display as recommended by ITU-R BT.2020 may cover a wider color range—up to over 75% of visible colors. In addition, the software and firmware implemented in a display platform may also alter the appearance of image content. As a result, image content, such as a motion picture or a streaming video, may appear very differently on various types of display platforms. If the image data of a motion picture previously mastered for an IMAX® cinema screen is released directly to a direct view LED cinema screen (which may be brighter and have an extended dynamic range) without additional mastering, the images can appear flat, the color can be washed out, and image quality can be significantly compromised.

A mastering process for motion pictures or video content can establish the appearance of image content for presentation on a designated display platform in an approved viewing environment, and the final appearance of image content can be approved by the content creator at a mastering facility. The image data of the approved image content is considered to be mastered for the designated display. A typical mastering process may include color grading in which various attributes of an image content are modified, including color, brightness, contrast, dynamic range, detail, black level, white point, etc. Mastering can be performed in a professional facility equipped with appropriate display devices calibrated for a certain viewing environment. The display device and the viewing environment is representative of the designated display platform to which the image content is to be released. For example, a motion picture can be mastered for a DCI-complaint cinema environment, and the facility can be equipped with a DCI-certified digital cinema projector, a projection screen with the correct screen gain, and a dark viewing environment that represents the environment of a typical movie theatre. Color grading can be applied to each scene of the motion picture so that image color appears correct and consistent. A mastering process may also include HDR up-conversion or tone mapping when the dynamic range of the image content is to be extended or compressed. An HDR up-conversion process can extend the dynamic range of SDR source image content for a certain HDR displays, and it can be applied through an automated process or an interactive process. A tone-mapping process can compress the dynamic range of source image content to match lower dynamic range displays, and the process can be automated. A mastering process may also involve modifying the resolution or aspect ratio of the image content to conform to the resolution and the aspect ratio of the intended display platform.

A professional mastering facility can be calibrated for a viewing environment that represents normal viewing conditions for a designated display platform. A motion picture is typically mastered in a dark environment representative of a cinema where the amount of ambient light is minimized. A video production suite may allow a certain amount of ambient light in simulation of a home viewing environment. Significant changes to the viewing environment may result in unacceptable image appearance distortion unless properly compensated. For example, when the motion picture is to be released for home TV or for mobile devices with a much brighter viewing environment than a theatre, additional color grading can be applied to compensate appearance distortions from the existence of ambient light or daylight. In addition, due to the time-varying nature of motion pictures or video content, certain mastering methods may track the motion information in the image content, including by using algorithms for estimating pixel motion and tracking pixel movement over multiple image frames. Motion estimation and tracking may include optical flow-based methods and more sophisticated trajectory-based methods that can be complex and computationally expensive. Mastering image content for each applicable display platform and for a broad range of viewing conditions can become time consuming, impractical, and cost prohibitive.

In some examples, image content can be modified so that the image content may be displayed on different display platforms with a consistent and approved appearance without involving costly mastering processes. Image content can be processed using a sequence of reference image data that is characterized with selected attributes such that the image content can be enhanced by transferring some of the attributes from the reference image data to the image content. Image content can also be processed for an unknown display platform using reference image data that is characterized with selected attributes such that the image content is enhanced by transferring some of the attributes from the reference image data to the image content for the unknown display to achieve a preferred appearance.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a schematic of an environment for modifying image content for different display devices according to one example of the present disclosure. Source image content 10 can be mastered for a first display platform 22 through a mastering process module 40, resulting in a first version of image data that is first format of display image data 20. The first format of display image data 20 can provide a preferred appearance when displayed on the first display platform 22. The same source image content 10 can also mastered through a mastering process module 40 for a second display platform 32 with a different set of characteristics, resulting in a second version of image data that is a second format of display image data 30. The second format of display image data 30 can produce a preferred appearance when displayed on the second display platform 32. Because the first format of display image data 20 and the second format of display image data 30 are mastered for different display platforms, each may acquire different attributes, such as differences in color, brightness, contrast, dynamic range, detail, black level, white point, aspect ratio, resolution, frame rate, and data format, even though the versions originate from the same source image data. In some cases, the first format of display image data 20 and the second format of display image data 30 may result in different image frames as the result of individual editing processes.

A processing method module 50 can convert the first format of display image data 20 to a modified version of image data that is an enhanced image data for display 70, while using the second format of display image data 30 as a reference image data. The enhanced image data for display 70 can be produced such that certain types of attributes are transferred from the second format of display image data 30 into the first format of display image data 20, and the enhanced image data for display 70 can provide a preferred appearance when displayed on a third display platform 72 that has different characteristics from the first display platform 22. The third display platform 72 may or may not share similar characteristics with the second display platform 32. In the case of the third display platform 72 being vastly different then the second display platform 32, the processing method module 50 may receive certain information that defines the characteristics of the third display platform 72. Such information may also include the descriptions of the intended viewing conditions for the third display platform 72. The characteristics of the third display platform 72, and the descriptions of the intended viewing conditions for the third display platform 72, may be included in third display specifications 60. The information included in the third display specifications 60 may be received from the manufacturers of the third display platform 72, or it can also be received from measurements of the third display platform 72 under certain viewing conditions.

In one implementation, the source image content 10 may be a motion picture, and the first display platform 22 may be a digital cinema that meets DCI specifications including a peak brightness of 14 foot lamberts or 48 nits and a DCI-P3 color space. The first format of display image data 20 may be a digital cinema package (DCP) of the motion picture that is mastered for and distributed to the digital cinema that meets DCI specifications. The second display platform 32 may be a HDR-capable TV display that supports a peak brightness up to 1000 nits, a much lower black level and Rec 2020 color gamut. Examples of the second display platform 32 may be certain brands of OLED and quantum dots home TV devices. The second format of display image data 30 may be a HDR version of the motion picture mastered for distribution by a streaming service such as Netflix™

HBO™, Hulu™, or Disney+™. The second format of display image data 30 may have a streaming data format with advanced video coding. The third display platform 72 may be a direct-view LED cinema screen that supports a peak brightness level of up to 300 nits, with an extended dynamic range and a wider color gamut, in comparison with the first display platform 22. An existing motion picture DCP can be converted to an enhanced DCP for release to an LED cinema, and the enhanced image data for display 70 can be the enhanced DCP.

In another example, the first format of display image data 20 may be an HDR version of a motion picture, formatted for HDR streaming services, for a first display platform 22 that is an HDR-capable TV device. The second format of display image data 30 may be a DCP of the same motion picture specially mastered for IMAX™ theatre releases for a second display platform 32 that is an IMAX™ theatre with a higher set of technical specifications than a conventional digital cinema, including a higher peak brightness, a higher picture resolution, and a different large format cinema environment. The IMAX™ DCP can be a cleaner and sharper version of the motion picture that is specially mastered using an image enhancement computing process such as IMAX™ DMR or IMAX™ digital mastering process, in which additional image detail may be recovered and unwanted noise suppressed. The HDR version of the motion picture can be enhanced with the cleaner and sharper version of the IMAX™ DCP. The result can be enhanced image data for display 70, which may be a higher-quality HDR streaming release of the motion picture for advanced services including IMAX™ enhanced services.

In another example, the first format of display image data 20 may be an IMAX™ DCP of a motion picture, and the second format of display image data 30 may be an HDR version of the motion picture mastered for home TV. The third display platform 72 may be a home theatre equipped with a 150-inch, direct-view LED screen. The LED screen may be based on advanced mini-LED or MicroLED modular panels that can deliver a peak brightness level of up to 1000 nits and a much higher contrast ratio. The LED home theatre can be HDR capable and can operate under a home, room-type environment with ambient lighting. In this case, the movie titles from an IMAX™ film library can be enhanced for LED home theatre. The enhanced image data for display 70 may be an IMAX™ home HDR distribution package.

Figure 2:
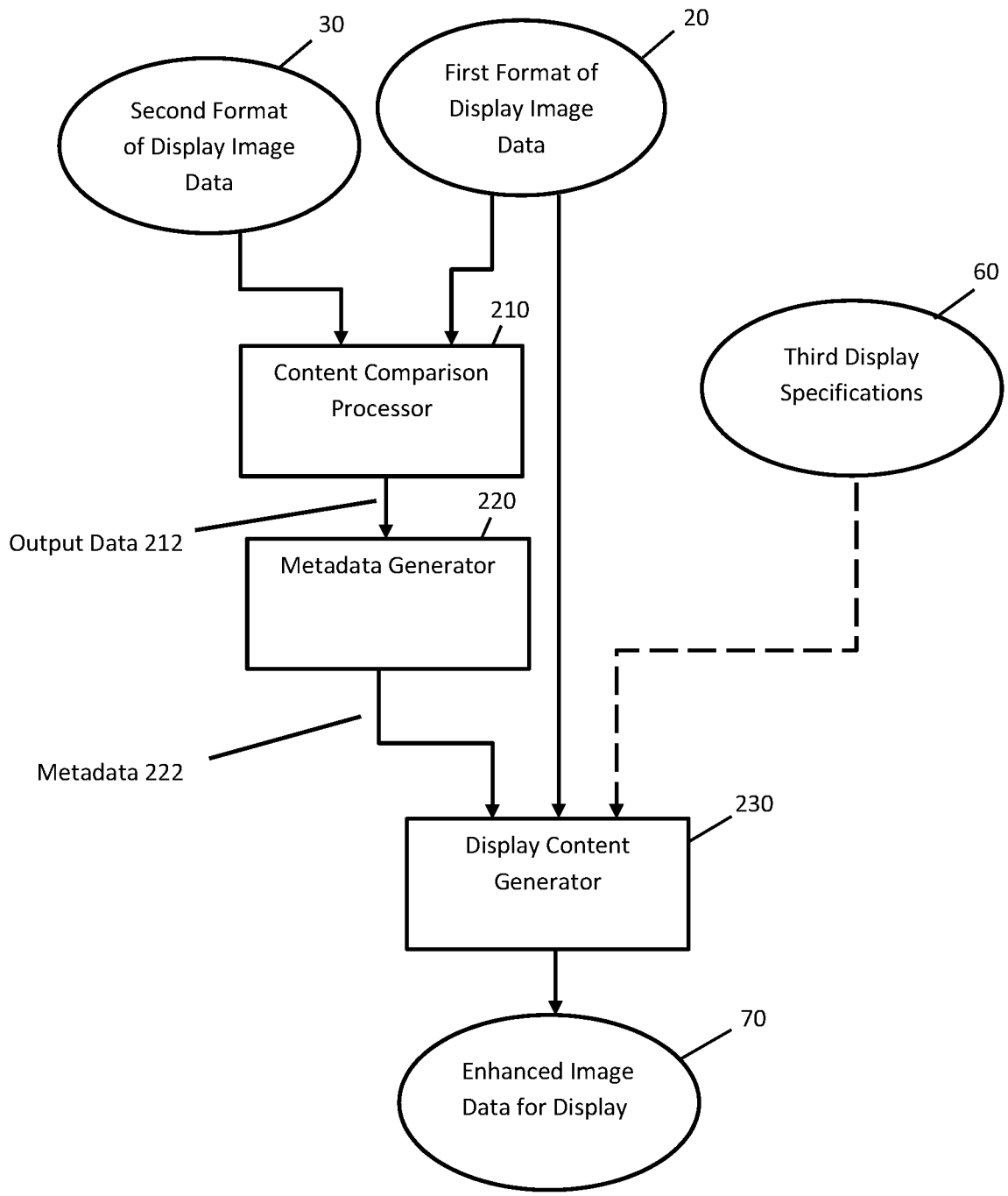
FIG. 2 is a flow diagram of a process for enhancing image content to be displayed on different types of displays according to one example of the present disclosure.

FIG. 2 is a flow chart of a process for enhancing image content to be displayed on different types of displays according to one example of the present disclosure. First format of display image data 20 can be processed with certain types of attributes that are enhanced to deliver a preferred appearance on a third display platform. Second format of display image data 30 can be selected for demonstrating at least a portion of such attributes, such as a higher dynamic range, or a wider color gamut, or a higher picture resolution. In some examples, the second format of display image data 30 serves as a reference image data for including a number of preferred attributes. A learning-based process can be introduced to enrich the first format of display image data 20 with certain preferred attributes from the second format of display image data 30. The resulting enhanced version of the image data is the enhanced image data for display 70 that can exhibit a preferred appearance when displayed on a third display platform 72 in which the characteristics can be described by third display specifications 60.

The learning-based process in FIG. 2 can include a content comparison processor 210, a metadata generator 220, and a display content generator 230. In some examples, these are software modules that can be executed by a computing device to perform certain operations. For example, the content comparison processor 210 can compute and identify preferred attributes from the second format of display image data 30 for use to enhance the first format of display image data 20. The computing output data 212 from the content comparison processor 210 can be packaged in a compact form of metadata 222 by the metadata generator 120 to facilitate efficient and secure distribution. The metadata 222 may be used by the display content generator 230 to render the enhanced image data for display 70, which can further be fine-tuned based on the information from the third display specifications 60 to achieve a desired appearance on a third display platform.

Figure 3:
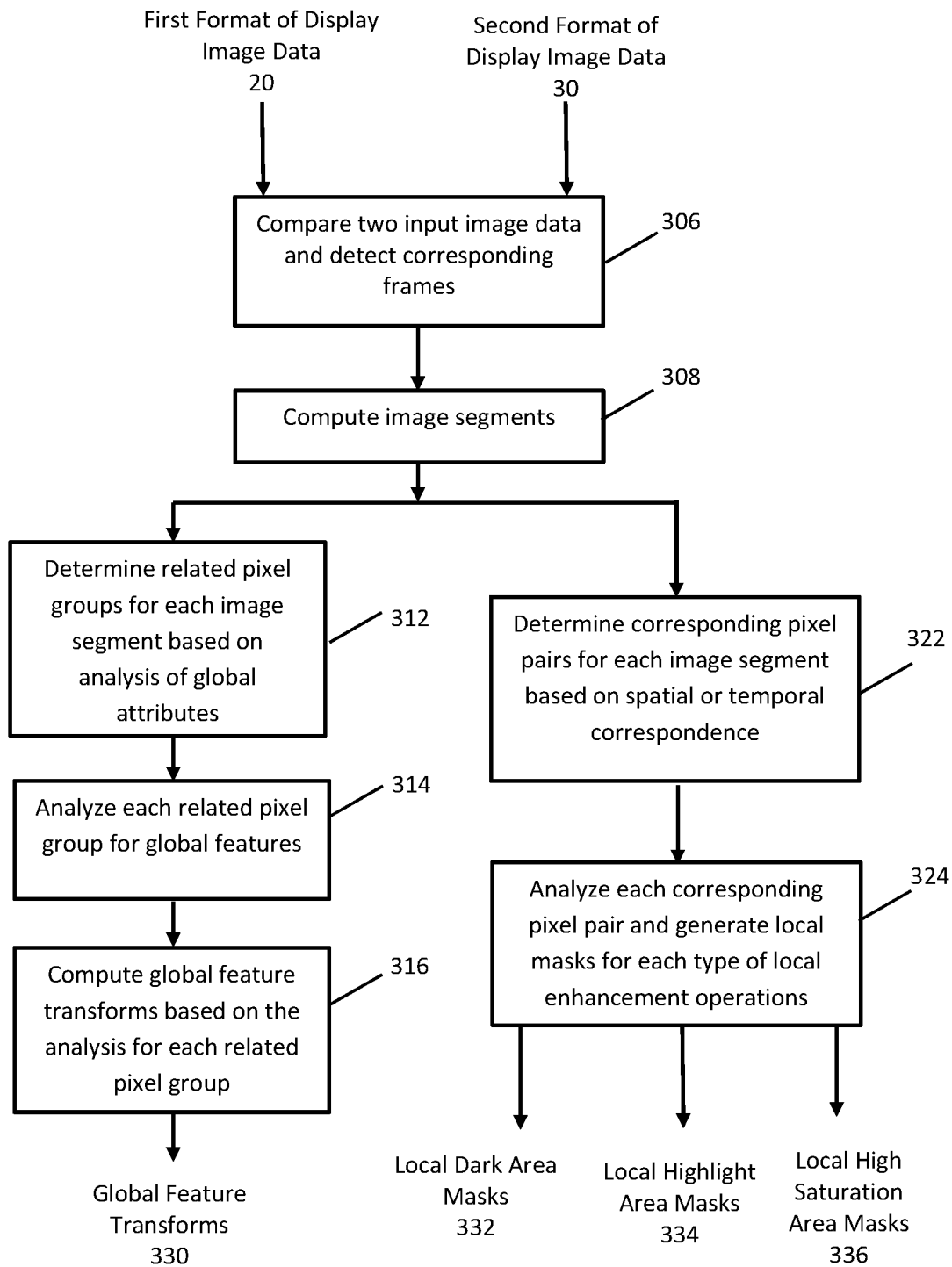
FIG. 3 is a flow chart of a learning-based process implemented by a content comparison processor according to one example of the present disclosure.

FIG. 3 is a flow chart of a learning-based process that can be implemented by a content comparison processor according to one example of the present disclosure. For example, the content comparison processor 210 of FIG. 2 can receive first input image data as the first format of display image data 20, and can receive second input image data as the second format of display image data 30. The two versions of input image data are mastered for different display platforms, and each may have acquired different attributes as a result of different mastering processes. For example, the first format of display image data 20 may be in a format of a cinema DCP with a 4K resolution, 1.896:1 aspect ratio, and a 24 fps frame rate, mastered for a cinema display with a peak brightness of 75 nits and DCI P3 color space. And, the second format of display image data 30 may be in a form of a streaming video with a HD resolution, a Cinemascope aspect ratio of 2.39:1, and a 60 fps frame rate, mastered for a HDR display with a peak brightness of 1000 nits and Rec 2020 color space. In this example, the two versions of input image data can have different attributes, such as different frame count for a scene, different pixel count in a frame, or different pixel values for a same content.

In block 306, the input image data are compared to detect corresponding frames between the first format of display image data 20 and the second format of display image data 30. The corresponding frames between the two versions of input image data can form a collection of the image frames from both versions that represent similar image content but may have different attributes. Because the two versions of input image data may have different frame rates or may have different edits done, the corresponding frames from the two versions may differ in frame counts or in length duration. Detecting corresponding frames may be based on the analysis of certain global attributes that are shared by both versions of the input image data.

A global attribute can be an attribute that is present over most or all of an image segment. Picture resolution is an example of a global attribute since picture resolution is typically applicable over the entirety of an image segment. Another example is color range, which includes the same color grading applied to the entire image segment at the mastering stage. Other examples of global attributes may include dynamic range, luminance distributions, and sharpness. These examples may jointly determine the appearance of the input image data. Another example of a global attribute can include motion statistics.

In contrast to global attributes, local attributes are attributes that are applicable to local areas of an image frame or of an image segment, rather than to most or all of an image segment. Examples of local attributes can include picture details within occluded regions, picture details within certain highlight areas, or noise in certain dark regions, etc. Local attributes also include attributes that cannot be defined by global features or attributes that are properly transferred by more complex local operations, such as certain color saturation that may not be mathematically modeled within a color system.

In block 308, image segments are computed by breaking down the corresponding frames into image segments using image analysis computations. An image segment can represent a continuity of an action at a specific scene. The frame count of an image segment may vary between two versions of the input image data because the versions may have different frame rates or have different edits. As an example, a 10-second long image segment from the first format of display image data 20 can contain 240 frames, but the same image segment from the second format of display image data 30 may have 600 frames. Computing image segments may be based on the analysis of changes of certain global attributes in the temporal domain, such as changes of color, luminance, and motion statistics. The analysis of continuity of certain global attributes may be used to refine the segmentation decisions. As a result, each image segment from block 308 can include the image frames from both versions of the input image data, and the two versions of image data represents similar image content but may contain different attributes including different frame counts.

Image segments with image frames from both versions of the input image data can reflect global attributes and local attributes. The image segments can be further analyzed to identify the types of attributes that may be transferred from the second input image data to enhance the first input image data. The different types of attributes—global attributes and local attributes can be further processed separately and differently. Global attributes can be processed via blocks 312, 314, and 316. Local attributes can be processed via blocks 322 and 324.

In general, transferring a global attribute from the second input image data to the first input image data may be performed by computing a global feature transform. A global attribute may be defined as a global feature with a mathematical description. For example, the dynamic range of an image segment can be mathematically modeled by a pixel luminance distribution curve. A mathematical transform that converts one version of the global attribute to another version can be referred to as a global feature transform. Global feature transforms may include, but are not limited to, scalers, matrixes, linear or nonlinear transfer functions, affine transforms, look-up tables including 3D LUTS, and conversion algorithms. For example, the conversion of color ranges from one tristimulus color system to another tristimulus color system can be realized through a matrix transformation. In some cases, a global feature transform may be complex such that it is described by an algorithm solution. For example, picture resolution can be a global attribute, and the conversion of an image to a higher resolution image involves an algorithm solution such as an upscaling algorithm or a more sophisticated super-resolution algorithm.

Blocks 312, 314 and 316 can compute the global feature transforms 330 for the transfer of global attributes between versions of input image data. In block 312, each image segment is analyzed to identify pixels that are available in both versions of input image data. A portion of the pixels in one version of input image data may not exist in the other version, due to, for example, differences in aspect ratio or frame cropping. But, the pixels that are jointly shared by both versions of input image data can form a related pixel group, and related pixel groups for the image frames in each image segment can be identified. A related pixel group may be identified based on the types of global attributes among the different versions of input image data. In block 314, each related pixel group is analyzed to determine global features. Subsequent to determining global features, a global feature transform or a set of global feature transforms 330 are computed in block 316. The global feature transforms 330 can be used to transfer certain global attributes from the second input image data to the first input image data by a display content generator.

Local attributes from the image segments can be processed separately from global attributes, such as by being processed in blocks 322 and 324, which can identify the local attributes that are to be transferred from the second input image data and can determine how local operations can be applied for the transfer of the attributes to the first input image data. In block 322, each image segment is further analyzed to determine if there is additional information from the second input image data that is missing from the first input image data. Examples of additional information may include extra image areas, higher resolution details in certain areas, revealed details in occluded areas due to increased frame rate, new details discovered in certain dark areas of the image frames, new details revealed in some highlight areas due to increased dynamic range, saturated colors outside the current color gamut limitation, etc. A corresponding pixel pair is an image pixel in an image segment of a first input image data that has a corresponding image pixel in an image segment of a second input image data. Corresponding pixel pairs may be identified based on analyzing spatial correspondence or temporal correspondence between the first input image data and the second input image data. Corresponding pixel pairs can mark and reveal image areas with additional information from both versions of input image data.

In block 324, each corresponding pixel pair is further analyzed to determine what types of local transfer operation is needed for enhancement. One or more sets of local mask sequences 332, 334, 336 can be generated to provide guidance for each type of local transfer operations. A local mask sequence can be a form of a sequence of grayscale images in which the locations where local transfer operations may be needed in a particular frame are marked. In addition, a local mask sequence may also provide parameters to guide the local transfer operation to be applied correctly. In one example, the local transfer operation may include an image sharpening function, and the local mask sequence may include sharpening level values for each pixel location. In addition or alternatively, the local transfer operation may include a blending operation, and the local mask sequence may provide blending opacity values. A local mask sequence can be outputted as a mask file and can be used to transfer certain local attributes between the first image content data and the second image content data.

In FIG. 3, three types of local mask sequences are listed, including local dark area masks 332, local highlight area masks 334, and local high saturation area masks 336. The local dark area masks 332 may be generated for detail recovery in certain dark areas of the image. Such details may be crushed or significantly suppressed in the first input image data but may be preserved in the second input image data as a result of an extended dynamic range or more careful post-production practices. The local highlight area masks 334 may be generated to recover extra details in some highlight areas, for example in response to the second input image data being mastered for an extended dynamic range. The local high saturation area masks 336 may be used to mark areas where extra colors are available in the second input image data because of the use of a wider color gamut. Although three examples of types of masks are shown in FIG. 3, other types of local masks can also or alternatively be generated depending on enhancement objectives. In addition, any type of local mask may be further categorized into more sub-groups of local masks based on image content, and each sub-group of local masks can be used for the transfer of a specific type of local attributes.

Returning to FIG. 2, the content comparison processor 210 can generate a set of global feature transforms and a number of local mask sequences for enhancing the first format of display image data 20 via the process in FIG. 3 or otherwise. The output data 212 from the content comparison processor 110 may be used directly by the display content generator 130 to perform the image enhancement. In certain applications, however, the output data 212 may be stored for later processing, or may be sent to a different location to complete the enhancement. In those cases, the output data 212 can be packaged into a more compact form to facilitate storage and transmission with higher efficiency and security. As shown in FIG. 2, a metadata generator 220 can organize the output data 212 from the content comparison processor 210 into a data file format that is metadata 222.

The metadata 222 may have a container format and may serve as a wrapper of dynamic image and data information. The metadata 222 may have a flexible data structure that includes a header, a footer, and essence containers that can be frame-wrapped, clip-wrapped, segment-wrapped, or custom-wrapped. The metadata 222 can include timecode information to support global feature transforms that may vary from image segment to image segment, and to support local masks that may vary from frame to frame. The metadata 222 can also include global feature transforms and different types of local masks, each a grayscale image sequence. The metadata generator 220 may perform image coding so that the local mask sequences or other frame-based information may be encoded in a highly compressed form. The metadata generator 220 may also perform data encryption to secure the encoded information. The metadata 222 may have a proprietary file format, and it may also use an industrial standardized open file format such as MXF. The metadata 222 may be used by the display content generator 230 to produce enhanced image data.

Figure 4:
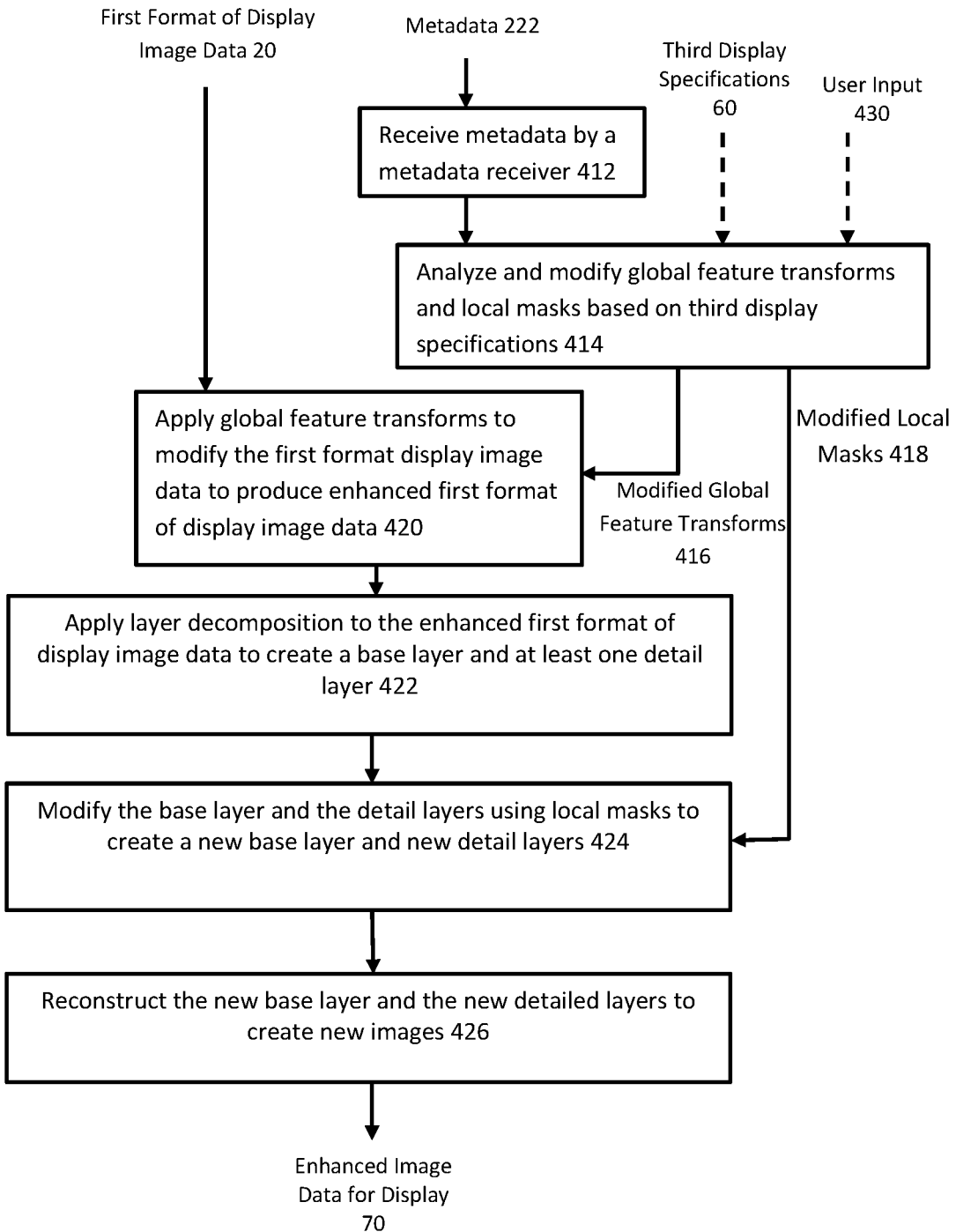
FIG. 4 is a flow chart of a process for producing enhanced image data by a display content generator according to one example of the present disclosure.

FIG. 4 is a flow chart of a process for producing enhanced image data by a display content generator according to one example of the present disclosure. In block 412, the metadata 222 is received by a metadata receiver for use in modifying the first format of image data 20 using the information from the metadata 222. The format of the metadata 222 can be determined to unwrap the global feature transforms for each image segment and to unwrap, and potentially decode, the local masks for each frame.

In block 414, the received and decoded metadata may be analyzed, and the global feature transforms and local masks may be modified based on third display specifications 60, if such specifications 60 are received. The third display specifications 60, which may include data about the characteristics of the third display platform, may be optionally received—e.g., in some cases the specifications 60 are not received. If the specifications 60 are received, block 414 can account for the specific characteristics of the third display platform and adjust the global feature transforms and local masks.

For example, a global feature transform may be modified based on certain relevant information described in the third display specifications 60. Examples of the types of modifications applied to a global feature transform can include scaling, interpolation, extrapolation, expansion, decomposition, linear, and non-linear mapping. In one example, a global feature transform is an electro-optical transfer function that may be scaled and interpolated, using the third display specifications, to match the dynamic range of the third display platform. In another example, a global feature transform includes a color conversion matrix, and a linear mapping may be applied to match the color primaries and color gamut of the third display platform as reflected in the third display specifications 60. Examples of global feature transforms may include color space conversion, dynamic range conversion, pixel resolution scaling, and luminance curve mapping.

The local masks decoded from the metadata 222 may also be analyzed and modified based on the characteristics of the third display platform. In one example, local highlight area masks can be analyzed and organized into a number of categories, including sparse highlight masks and spot highlight masks. Sparse highlight masks can include local highlight areas that are sparsely distributed over image frames. Examples of local highlight areas that are sparsely distributed over image frames can include bright stars in a night sky or city lights over a dark background. Sparse highlight masks may be used to improve picture dynamic range for a third display platform, such as a direct view LED display or an OLED display, which provides individual pixel controls. Spot highlight masks include one or a number of local highlight areas that are relatively large in size, or a cluster of highlight areas that form a distinctive highlight region. Spot highlight masks may be used to optimize picture dynamic range and overall picture quality for a third display platform, such as a projection system based on light steering technology, that can control picture dynamic range in a selected region. In another example, local masks may be organized based on the artistic directions of a content creator. The artistic direction of the content creator can be received through user input 430, which may include a user-friendly control device such as a graphic user interface, or even a pre-recorded data format. From block 414, the modified global feature transforms 416 and modified local masks 418 can be used to enhance the first format of display image data 20.

For example, in block 420, the modified global feature transforms 416 are applied to modify the first format of display image data 20 to produce enhanced first format of display image data. In one example, when one of the global feature transforms is HDR up-conversion, the transforms can be applied to the first display image data 20 to increase pixel dynamic range. In another example, when color space conversion is one of the global feature transforms, the first display image data 20 may be converted to a new color space with a wider color gamut.

In block 422, a layer decomposition process is applied to the enhanced first format display of image data to create a base layer and at least one detail layer. A number of multi-scale image decomposition methods may be used to separate details into a single high resolution layer or multiple higher resolution layers. Examples of image decomposition methods can include pyramid methods, wavelet methods, and scale-space methods. Selecting a proper method can depend on the types of local attributes to be transferred from the second format of image data. In one example, a wavelet decomposition method may be selected when extra image details are to be transferred from the second format of image data.

In block 424, the base layer and the detail layers are modified using modified local masks 418 at pixel locations to create a new base layer and new detail layers. Extra image information carried over by the local masks may be transferred to the base layer and the detail layers. Local operations and transfers can be performed at the base layer and detail layers based on the parameters provided in the local masks. As a result, the decomposed base layer and detail layers can be updated to form a new base layer and new detail layers. In block 426, new image data, including new images, is created by reconstructing the new base layer and the new detailed base layer. The result can be outputted as enhanced image data for display 70, which is an enhanced version of the first format of display image data 20.

Figure 5:
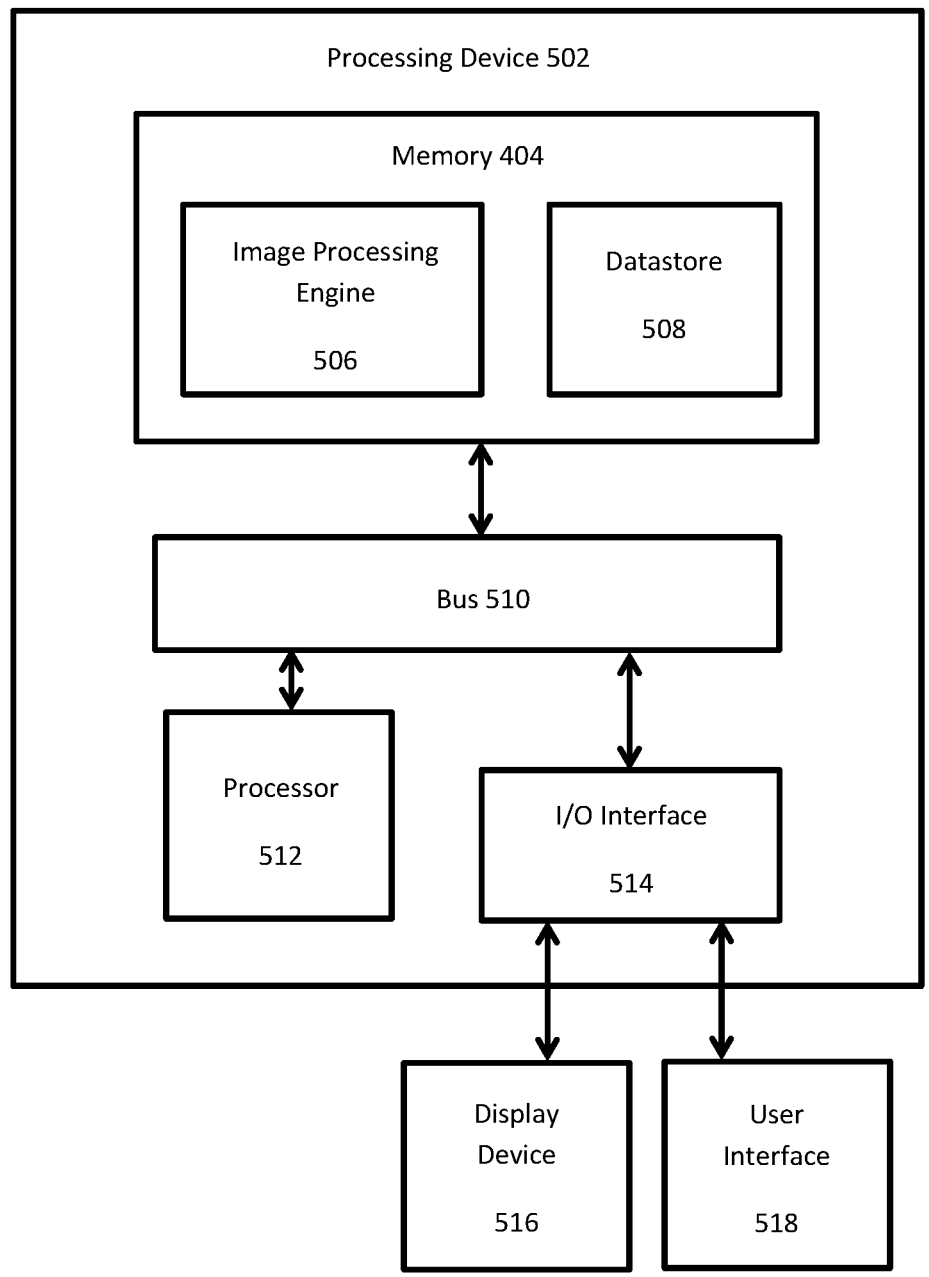
FIG. 5 is a block diagram of a system for enhancing image data according to one example of the present disclosure.

Various types of systems can be used to implement various examples of an image enhancement process, including such a process that includes using the content comparison processor 210, the metadata generator 220, and the display content generator 230 from FIG. 2. Examples of the types of systems that can be used include a system with a computing device and a system that includes multiple computing devices, each with certain responsibilities and functions. FIG. 5 is a block diagram of a system for enhancing image data according to various examples, including the examples described with reference to FIGS. 1 to 4.

The system in FIG. 5 includes a processing device 502, a display device 516, and a user interface 518. The processing device 502 includes a processor 512, a memory 504, a bus 510, and an input/output (I/O) interface 514. The processor 512 can execute one or more operations for generating enhanced image display for display on a third type of display device using image data mastered for display on a first type of display device and using image data mastered for display on a second type of display device. The processor 512 can execute instructions stored in the memory 504 to perform the operations. The processor 512 can include one processing device or multiple processing devices or cores. Non-limiting examples of the processor 512 include a Field-Programmable Gate Array ("FPGA"), an application-specific integrated circuit ("ASIC"), a microprocessor, etc.

The processor 512 can be communicatively coupled to the memory 504 via the bus 510. The non-volatile memory 504 may include any type of memory device that retains stored information when powered off. Non-limiting examples of the memory 504 include EEPROM, flash memory, or any other type of non-volatile memory. In some examples, at least part of the memory 504 can include a medium from which the processor 512 can read instructions. A computer-readable medium can include electronic, optical, magnetic, or other storage devices capable of providing the processor 512 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The memory 504 can processor-executable instructions as an image processing engine 506, along with a datastore 508. For example, the image processing engine 506 can be executed by the processor 512 to perform the functions of the content comparison processor 210, the metadata generator 220, and the display content generator 230 from FIG. 2.

The I/O interface 514 can communicate with other components, for example to receive first format of display image data, second format of display image data, and third display specifications, which may be received via the user interface 518. The I/O interface 514 can also output enhanced image data, and other information for display by display device 516.

Figure 6:
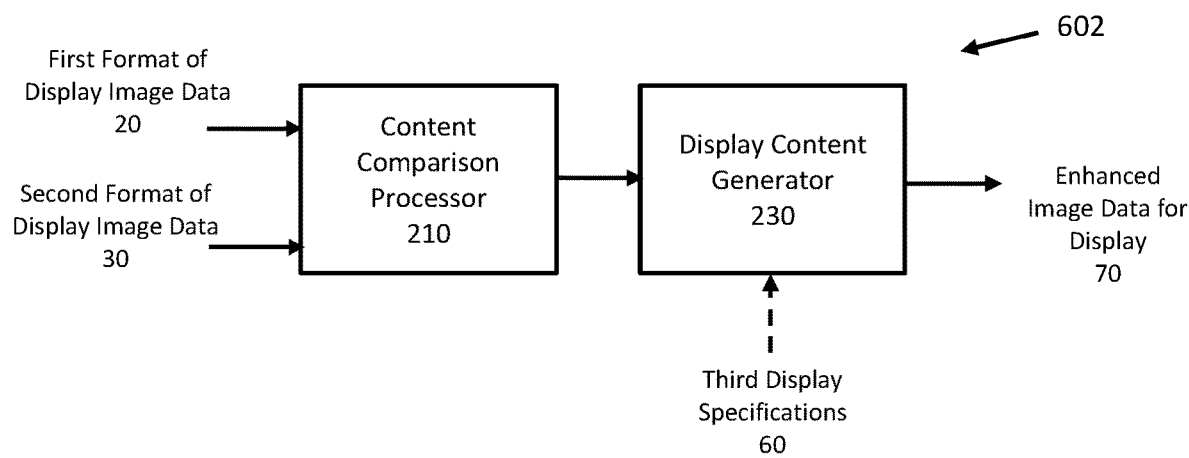
FIG. 6 is a block diagram of a configuration for enhancing image data for display on a different type of display device according to one example of the present disclosure.

Other system configurations are possible. FIG. 6 is a block diagram of a configuration 602 for enhancing image data for display on a different type of display device according to one example of the present disclosure. In the configuration 602, the global feature transforms and local masks computed by the content comparison processor 210 can be used directly by the display content generator 230 without involving metadata or metadata generation. This configuration 602 can be applied when the processing workflow is executed at a single location. For example, the configuration 602 may be implemented by a single processing device to perform the functions of both the content comparison processor 210 and the display content generator 230. That is, the first format of display image data 20 and the second format of display image data 30 is received and processed by the content comparison processor 210 (which may be part of the code stored on a computing device). The output of the content comparison processor 210 can be processed by the display content generator 230 (which may be another part of the code stored on the computing device), along with accounting for any available third display specifications 60, to output enhanced image data for display 70.

Figure 7:
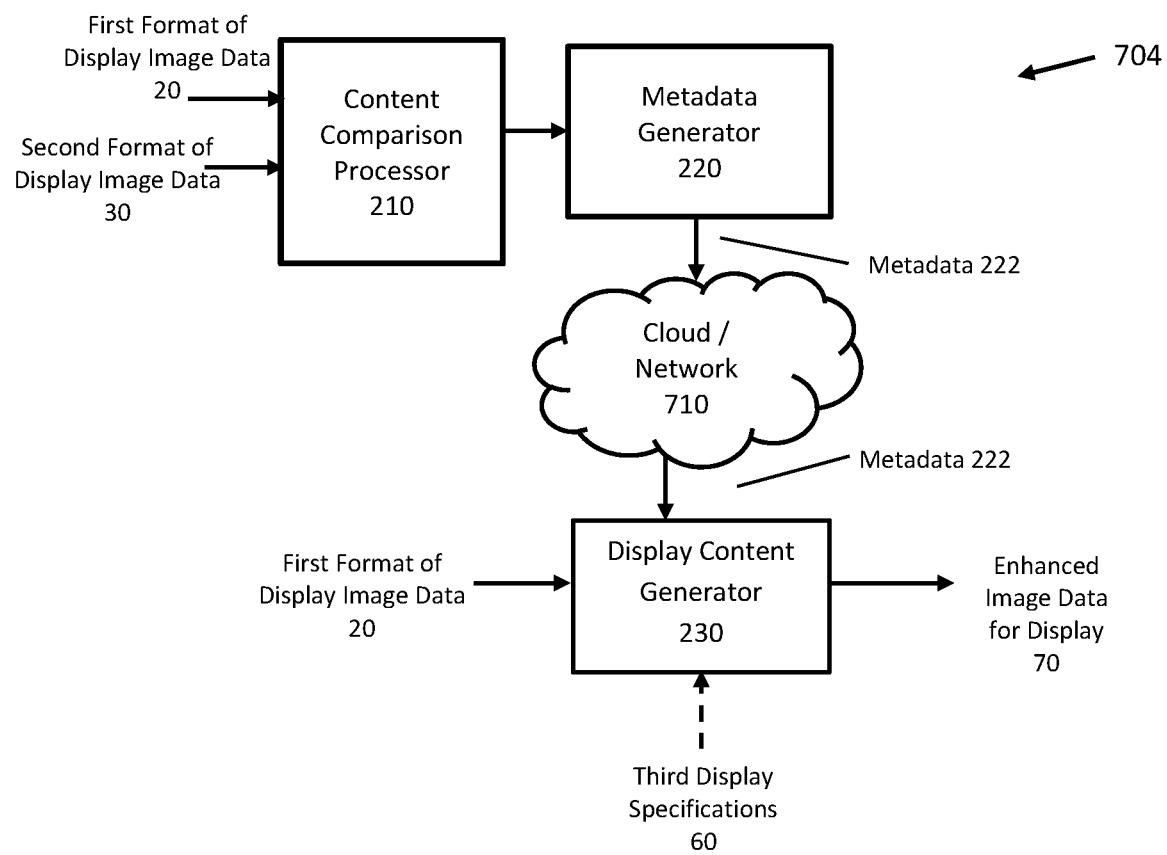
FIG. 7 is a block diagram of a second configuration for enhancing image data for display on a different type of display device according to one example of the present disclosure.

FIG. 7 is a block diagram of a second configuration 704 for enhancing image data for display on a different type of display device according to one example of the present disclosure. In the second configuration 704, the functions of the content comparison processor 210 and the metadata generator 220 may performed at a first location (at which first format of display image data 20 and second format of display image data 30 is received), and the functions of the display content generator 230 are executed at a second location that can be distant from the first location. The operations at the first location can include generating the metadata 222 in which the global feature transforms and local masks are encoded and packaged in a compact and secure form. The resulting metadata 222 can be transmitted to the second location through network or through a cloud-based platform 710. The metadata 222 can be received at the second location, along with the first format of display image data 20. A display content generator 230 can use the metadata 222, along with third display specifications (if available), to convert the first format of display image data 20 into enhanced image data for display 70. Transmitting metadata may be more secure than transmitting final enhanced image data, and such a configuration may be helpful when the party at the first location is a service provider and the party at the second location is a client with fewer computing resources and concerns for data security.

In some aspects, methods and systems for enhancing image data are provided according to one or more of the following examples:

Example #1: A method can include: receiving a first format of display image data mastered to be displayed on a first type of display system; receiving a second format of display image data mastered to be displayed on a second type of display system that is different than the first type of display system; detecting one or more corresponding pixels in image segments among the first format of display image data and the second format of display image data; and using attributes from the one or more corresponding pixels to generate enhanced image data for display.

Example #2: The method of Example #2 may feature using attributes from the one or more corresponding pixels to generate enhanced image data for display by: generating segmented image data by comparing the first format of display image data and the second format of display image data to determine a plurality of image data similarities and a plurality of image data differences; determining, based on spatial correspondence or temporal correspondence, a corresponding pixel pair between the first format of display image data and the second format of display image data from the segmented image data; defining a local mask sequence using the corresponding pixel pair; and outputting the local mask sequence as a mask file for generating enhanced image data to be displayed.

Example #3: The method of any of Examples #1-2 may feature the local mask sequence including at least one of a local dark area mask, a local highlight mask, or a local high saturation area mask.

Example #4: The method of any of Examples #1-3 may feature the generated enhanced image data being displayed on the first type of display system, the second type of display system, or a third type of display system.

Example #5: A method of image enhancement can include: receiving a first format of display image data mastered to be displayed on a first type of display system; receiving a second format of display image data mastered to be displayed on a second type of display system that is different than the first type of display system; generating segmented image data by comparing the first format of display image data and the second format of display image data to determine a plurality of image data similarities and a plurality of image data differences; determining, based on spatial correspondence or temporal correspondence, a corresponding pixel pair between the first format of display image data and the second format of display image data from the segmented image data; defining a local mask sequence using the corresponding pixel pair; and outputting the local mask sequence as a mask file for generating enhanced image data to be displayed.

Example #6: The method of Example #5 may feature the local mask sequence including at least one of a local dark area mask, a local highlight area mask, or a local high saturation area mask.

Example #7: The method of any of Examples #5-6 can include: determining, based on a global feature, a related pixel group between the first format of display image data and the second format of display image data for the segmented image data based on a global feature; determining a global feature transform by analyzing the related pixel group with the global feature; and outputting the global feature transform.

Example #8: The method of any of Examples #5-7 can include generating a metadata file based on the mask file and the global feature transform, the metadata file formatted to generate the enhanced image data.

Example #9: The method of any of Examples #5-8 can include: applying the global feature transform to modify the first format of display image data to produce enhanced first format of display image data; creating a base layer and a detailed layer by applying layer decomposition to the enhanced first format of display image data; modifying the base layer and the detailed layer using at least one mask to create a new base layer and a new detailed layer; and reconstructing the new base layer and the new detailed layer to create new enhanced image data for display.

Example #10: The method of any of Examples #5-9 may feature the first format of display image data being cinema image data.

Example #11: The method of any of Examples #5-10 can include: modifying a parameter in the global feature transform based on a third type of display system having a third display specification with a third display format to create transformation information; modifying the first format of display image data using the transformation information to create an enhanced first format image display data; decomposing the enhanced first format image display data to create a base layer and a detailed layer; modifying the base layer and the detailed layer with at least one mask to produce a new base layer and a new detailed layer; and reconstructing the new base layer and the new detailed layer to create new enhanced image data for display.

Example #12: The method of any of Examples #5-11 may feature the third type of display system as a large format display and the first type of display system as a small format display.

Example #13: The method of any of Examples #5-12 may feature the third type of display system being configured to display different brightness images than the first type of display system.

Example #14: The method of any of Examples #5-13 may feature the third type of display system being configured to display a different field of view than the first type of display system.

Example #15: The method of any of Examples #5-14 can include: analyzing and modifying a local highlight area mask based on a third display characteristics, the local highlight area mask as modified is further categorized as a sparse local highlight mask or a spot local highlight mask; modifying a parameter in the global feature transform based on a third display specification with a third display format and creating transformation information based on the parameter as modified; modifying the first format of display image data using the transformation information, the sparse local highlight mask or the spot local highlight mask to create an enhanced first format image display data; decomposing the enhanced first format data image data to create a base layer and a detailed layer; modifying the base layer and the detailed layer with at least one mask to produce a new base layer and a new detailed layer; and reconstructing the new base layer and the new detailed layer to create new enhanced image for display.

Example #16: A system can include a processing device and a non-transitory computer-readable memory comprising instructions that are executable by the processing device for causing the processing device to: receive a first format of display image data mastered to be displayed on a first type of display system; receive a second format of display image data mastered to be displayed on a second type of display system that is different than the first type of display system; detect one or more corresponding pixels in image segments among the first format of display image data and the second format of display image data; and use attributes from the one or more corresponding pixels to generate enhanced image data for display.

Example #17: The system of Example #16 may feature the memory further comprising instructions that are executable by the processor for causing the processor to use attributes from the one or more corresponding pixels to generate enhanced image data for display by: generating segmented image data by comparing the first format of display image data and the second format of display image data to determine a plurality of image data similarities and a plurality of image data differences; determining, based on spatial correspondence or temporal correspondence, a corresponding pixel pair between the first format of display image data and the second format of display image data from the segmented image data; defining a local mask sequence using the corresponding pixel pair; and outputting the local mask sequence as a mask file for generating enhanced image data to be displayed.

Example #18: The system of any of Examples #16-17 may feature the local mask sequence including at least one of a local dark area mask, a local highlight mask, or a local high saturation area mask.

Example #19: The system of any of Examples #16-18 may feature the generated enhanced image data being displayed on the first type of display system, the second type of display system, or a third type of display system.

Example #20: An image enhancement system may include a processing device; and a non-transitory computer-readable memory comprising instructions that are executable by the processing device for causing the processing device to: receive a first format of display image data mastered to be displayed on a first type of display system; receive a second format of display image data mastered to be displayed on a second type of display system that is different than the first type of display system; generate segmented image data by comparing the first format of display image data and the second format of display image data to determine a plurality of image data similarities and a plurality of image data differences; determine, based on spatial correspondence or temporal correspondence, a corresponding pixel pair between the first format of display image data and the second format of display image data from the segmented image data; define a local mask sequence using the corresponding pixel pair; and output the local mask sequence as a mask file for generating enhanced image data to be displayed.

Example #21: The image enhancement system of Example #20 may feature the local mask sequence including at least one of a local dark area mask, a local highlight area mask, or a local high saturation area mask.

Example #22: The image enhancement system of any of Examples #20-21 may feature the memory further comprising instructions that are executable by the processing device for causing the processing device to: determine, based on a global feature, a related pixel group between the first format of display image data and the second format of display image data for the segmented image data based on a global feature; determine a global feature transform by analyzing the related pixel group with the global feature; and output the global feature transform.

Example #23: The image enhancement system of any of Examples #20-22 may feature the memory further comprising instructions that are executable by the processing device for causing the processing device to: generate a metadata file based on the mask file and the global feature transform, the metadata file formatted to generate the enhanced image data.

Example #24: The image enhancement system of any of Examples #20-23 may feature the memory further comprising instructions that are executable by the processing device for causing the processing device to: apply the global feature transform to modify the first format of display image data to produce enhanced first format of display image data; create a base layer and a detailed layer by applying layer decomposition to the enhanced first format of display image data; modify the base layer and the detailed layer using at least one mask to create a new base layer and a new detailed layer; and reconstruct the new base layer and the new detailed layer to create new enhanced image data for display.

Example #25: The image enhancement system of any of Examples #20-24 may feature the first format of display image data as cinema image data.

Example #26: The image enhancement system of any of Examples #20-25 may feature the memory further comprising instructions that are executable by the processing device for causing the processing device to: modify a parameter in the global feature transform based on a third type of display system having a third display specification with a third display format to create transformation information; modify the first format of display image data using the transformation information to create an enhanced first format image display data; decompose the enhanced first format image display data to create a base layer and a detailed layer; modify the base layer and the detailed layer with at least one mask to produce a new base layer and a new detailed layer; and reconstruct the new base layer and the new detailed layer to create new enhanced image data for display.

Example #27: The image enhancement system of any of Examples #20-26 may feature the third type of display system being a large format display and the first type of display system being a small format display.

Example #28: The image enhancement system of any of Examples #20-27 may feature the third type of display system being configured to display different brightness images than the first type of display system.

Example #29: The image enhancement system of any of Examples #20-28 may feature the third type of display system being configured to display a different field of view than the first type of display system.

Example #30: The image enhancement system of any of Examples #20-29 may feature the memory further comprising instructions that are executable by the processing device for causing the processing device to: analyze and modify a local highlight area mask based on a third display characteristics, the local highlight area mask as modified is further categorized as a sparse local highlight mask or a spot local highlight mask; modify a parameter in the global feature transform based on a third display specification with a third display format and creating transformation information based on the parameter as modified; modify the first format of display image data using the transformation information, the sparse local highlight mask or the spot local highlight mask to create an enhanced first format image display data; decompose the enhanced first format data image data to create a base layer and a detailed layer; modify the base layer and the detailed layer with at least one mask to produce a new base layer and a new detailed layer; and reconstruct the new base layer and the new detailed layer to create new enhanced image data for display.

The foregoing is provided for purpose of illustrating, explaining, and describing embodiments of the present invention. Further modifications and adaptations to those embodiments will be apparent to those skilled in the art and may be made without departing from the scope or the spirit of the invention.

What is claimed is:

1. A method of enhancing image data for display on a third type of display platform based on a first format of display image data and a second format of display image data, comprising:
receiving the first format of display image data mastered to be displayed on a first type of display platform;
receiving the second format of display image data mastered to be displayed on a second type of display platform that is different than the first type of display platform;

detecting one or more corresponding pixels in image segments among the first format of display image data and the second format of display image data;

converting, by a processor, the first format of display image data to be enhanced image data by:

transferring attributes of one or more corresponding pixels from the second format of display image data into the first format of display image data; and using information that defines characteristics of the third type of display platform that are different from the first type of display platform to generate enhanced image data from the first format of display image data for display on the third type of display platform.

2. The method of claim 1, wherein transferring attributes of the one or more corresponding pixels from the second format of display image data into the first format of display image data comprises:

generating segmented image data by comparing the first format of display image data and the second format of display image data to determine a plurality of image data similarities and a plurality of image data differences;

determining, based on spatial correspondence or temporal correspondence, a corresponding pixel pair between the first format of display image data and the second format of display image data from the segmented image data;

defining a local mask sequence using the corresponding pixel pair; and outputting the local mask sequence as a mask file for generating enhanced image data to be displayed.

3. The method of claim 2, wherein the local mask sequence includes at least one of a local dark area mask, a local highlight area mask, or a local high saturation area mask.

4. The method of claim 1, wherein the characteristics of the third type of display platform are based on a specification from a manufacturer of the third type of display platform.

5. The method of claim 1, wherein the characteristics of the third type of display platform are based on measurements of the third type of display platform under certain viewing conditions.

6. A method of image enhancement for a third type of display platform, comprising:

receiving a first format of display image data mastered to be displayed on a first type of display platform;

receiving a second format of display image data mastered to be displayed on a second type of display platform that is different than the first type of display platform;

generating segmented image data by comparing the first format of display image data and the second format of display image data to determine a plurality of image data similarities and a plurality of image data differences;

determining, based on spatial correspondence or temporal correspondence, a corresponding pixel pair between the first format of display image data and the second format of display image data from the segmented image data;

defining a local mask sequence using the corresponding pixel pair;

using the local mask sequence as a mask file and information that defines characteristics of the third type of display platform for generating enhanced image data to be displayed on the third type of display platform.

7. The method of claim 6, wherein the local mask sequence includes at least one of a local dark area mask, a local highlight area mask, or a local high saturation area mask.

8. The method of claim 7, further comprising:

determining, based on a global feature, a related pixel group between the first format of display image data and the second format of display image data for the segmented image data based on a global feature;

determining a global feature transform by analyzing the related pixel group with the global feature; and outputting the global feature transform.

9. The method of claim 8, further comprising:

generating a metadata file based on the mask file and the global feature transform, the metadata file formatted to generate the enhanced image data.

10. The method of claim 8, further comprising:

applying the global feature transform to modify the first format of display image data to produce enhanced first format of display image data;

creating a base layer and a detailed layer by applying layer decomposition to the enhanced first format of display image data;

modifying the base layer and the detailed layer using at least one mask to create a new base layer and a new detailed layer; and reconstructing the new base layer and the new detailed layer to create new enhanced image data for display.

11. The method of claim 8, further comprising:

modifying a parameter in the global feature transform based on the third type of display platform having a third display specification with a third display format to create transformation information;

modifying the first format of display image data using the transformation information to create an enhanced first format image display data;

decomposing the enhanced first format image display data to create a base layer and a detailed layer;

modifying the base layer and the detailed layer with at least one mask to produce a new base layer and a new detailed layer; and reconstructing the new base layer and the new detailed layer to create new enhanced image data for display.

12. The method of claim 11, wherein the third type of display platform is a large format display and the first type of display platform is a small format display.

13. The method of claim 11, wherein the third type of display platform is configured to display different brightness images than the first type of display platform.

14. The method of claim 11, wherein the third type of display platform is configured to display a different field of view than the first type of display platform.

15. The method of claim 8, further comprising:

analyzing and modifying a local highlight area mask based on a third display characteristics, the local highlight area mask as modified is further categorized as a sparse local highlight mask or a spot local highlight mask;

modifying a parameter in the global feature transform based on a third display specification with a third display format and creating transformation information based on the parameter as modified;

modifying the first format of display image data using the transformation information, the sparse local highlight mask or the spot local highlight mask to create an enhanced first format image display data;

decomposing the enhanced first format data image data to create a base layer and a detailed layer;

modifying the base layer and the detailed layer with at least one mask to produce a new base layer and a new detailed layer; and reconstructing the new base layer and the new detailed layer to create new enhanced image for display.

16. The method of claim 6, wherein the first format of display image data is cinema image data.

17. A system for enhancing image data for display on a third display platform based on a first format of display image data and a second format of display image data, the system comprising:

a processing device; and a non-transitory computer-readable memory comprising instructions that are executable by the processing device for causing the processing device to:

receive a first format of display image data mastered to be displayed on a first type of display platform;

receive a second format of display image data mastered to be displayed on a second type of display system that is different than the first type of display platform;

detect one or more corresponding pixels in image segments among the first format of display image data and the second format of display image data;

convert the first format of display image data to be enhanced image data by:

transferring attributes of one or more corresponding pixels from the second format of display image data into the first format of display image data; and using information that defines characteristics of the third display platform that are different from the first type of display platform to generate enhanced image data from the first format of display image data for display on the third display platform.

18. The system of claim 17, wherein the memory further comprises instructions that are executable by the processing device for causing the processing device to transfer attributes of the one or more corresponding pixels from the second format of display image data into the first format of display image data by:

generating segmented image data by comparing the first format of display image data and the second format of display image data to determine a plurality of image data similarities and a plurality of image data differences;

determining, based on spatial correspondence or temporal correspondence, a corresponding pixel pair between the first format of display image data and the second format of display image data from the segmented image data;

defining a local mask sequence using the corresponding pixel pair; and outputting the local mask sequence as a mask file for generating enhanced image data to be displayed.

19. The system of claim 18, wherein the local mask sequence includes at least one of a local dark area mask, a local highlight area mask, or a local high saturation area mask.

20. An image enhancement system for a third type of display platform, comprising:

a processing device; and a non-transitory computer-readable memory comprising instructions that are executable by the processing device for causing the processing device to:

receive a first format of display image data mastered to be displayed on a first type of display platform;

receive a second format of display image data mastered to be displayed on a second type of display platform that is different than the first type of display platform;

generate segmented image data by comparing the first format of display image data and the second format of display image data to determine a plurality of image data similarities and a plurality of image data differences;

determine, based on spatial correspondence or temporal correspondence, a corresponding pixel pair between the first format of display image data and the second format of display image data from the segmented image data;

define a local mask sequence using the corresponding pixel pair;

use the local mask sequence as a mask file and information that defines characteristics of the third type of display platform for generating enhanced image data to be displayed on the third type of display platform.

21. The image enhancement system of claim 20, wherein the local mask sequence includes at least one of a local dark area mask, a local highlight area mask, or a local high saturation area mask.

22. The image enhancement system of claim 21, wherein the memory further comprises instructions that are executable by the processing device for causing the processing device to:

determine, based on a global feature, a related pixel group between the first format of display image data and the second format of display image data for the segmented image data based on a global feature;

determine a global feature transform by analyzing the related pixel group with the global feature; and output the global feature transform.

23. The image enhancement system of claim 22, wherein the memory further comprises instructions that are executable by the processing device for causing the processing device to:

generate a metadata file based on the mask file and the global feature transform, the metadata file formatted to generate the enhanced image data.

24. The image enhancement system of claim 22, wherein the memory further comprises instructions that are executable by the processing device for causing the processing device to:

apply the global feature transform to modify the first format of display image data to produce enhanced first format of display image data;

create a base layer and a detailed layer by applying layer decomposition to the enhanced first format of display image data;

modify the base layer and the detailed layer using at least one mask to create a new base layer and a new detailed layer; and reconstruct the new base layer and the new detailed layer to create new enhanced image data for display.

25. The image enhancement system of claim 22, wherein the memory further comprises instructions that are executable by the processing device for causing the processing device to:

modify a parameter in the global feature transform based on a third type of display platform having a third display specification with a third display format to create transformation information;

modify the first format of display image data using the transformation information to create an enhanced first format image display data;

decompose the enhanced first format image display data to create a base layer and a detailed layer;

modify the base layer and the detailed layer with at least one mask to produce a new base layer and a new detailed layer; and reconstruct the new base layer and the new detailed layer to create new enhanced image data for display.

26. The image enhancement system of claim 25, wherein the third type of display platform is a large format display and the first type of display platform is a small format display.

27. The image enhancement system of claim 25, wherein the third type of display platform is configured to display different brightness images than the first type of display platform.

28. The image enhancement system of claim 25, wherein the third type of display platform is configured to display a different field of view than the first type of display platform.

29. The image enhancement system of claim 22, wherein the memory further comprises instructions that are executable by the processing device for causing the processing device to:

analyze and modify a local highlight area mask based on a third display characteristics, the local highlight area mask as modified is further categorized as a sparse local highlight mask or a spot local highlight mask;

modify a parameter in the global feature transform based on a third display specification with a third display format and creating transformation information based on the parameter as modified;

modify the first format of display image data using the transformation information, the sparse local highlight mask or the spot local highlight mask to create an enhanced first format image display data;

decompose the enhanced first format data image data to create a base layer and a detailed layer;

modify the base layer and the detailed layer with at least one mask to produce a new base layer and a new detailed layer; and reconstruct the new base layer and the new detailed layer to create new enhanced image data for display.

30. The image enhancement system of claim 20, wherein the first format of display image data is cinema image data.

* * * * *